United States Patent
Hsin (10) Patent No.: US 9,753,358 B1
(45) Date of Patent: Sep. 5, 2017

(54) CARRIER SLIDE-BAR DEVICE IN ARC MOTION

(71) Applicant: Wen Chun Liu, Chesterfield, MO (US)

(72) Inventor: Ping-Hung Hsin, New Taipei (TW)

(73) Assignee: Wen Chun Liu, Chesterfield ( * ) Notice: Subject to any disclaimer, the term of this patent is extended or adjusted under 35 U.S.C. 154(b) by 0 days.

(21) Appl. No.: 15/356,753

(22) Filed: Nov. 21, 2016

(51) Int. Cl.
*G03B 17/00* (2006.01)
*G03B 17/56* (2006.01)
*F16M 13/02* (2006.01)
*F16M 11/42* (2006.01)

(52) U.S. Cl.
CPC ......... *G03B 17/561* (2013.01); *F16M 11/425* (2013.01); *F16M 13/022* (2013.01)

(58) Field of Classification Search
CPC ............................ G03B 17/561; F16M 11/425
USPC ................................ 352/242, 243; 396/428
See application file for complete search history.

(56) References Cited

U.S. PATENT DOCUMENTS

| | | | | |
|---|---|---|---|---|
| 7,794,088 B1 * | 9/2010 | Saad | ...................... | G03B 17/00 248/298.1 |
| 8,142,019 B2 * | 3/2012 | Hernandez | ............. | F16M 11/06 348/373 |
| 8,858,098 B1 * | 10/2014 | Hart | ...................... | F16M 11/045 396/428 |
| 8,967,889 B2 * | 3/2015 | Kessler | ................ | G03B 17/561 396/428 |
| 9,046,743 B2 * | 6/2015 | Koymen | ............... | G03B 17/561 396/428 |
| 2015/0234258 A1 * | 8/2015 | Hida | ...................... | F16M 11/20 396/428 |

* cited by examiner

Primary Examiner — William C Dowling (57) ABSTRACT

A carrier slide-bar device in arc motion includes: a first, a second, and a third slide bar respectively having a first, a second, and a third guide rail, where the third slide bar is provided with an active seat and a passive seat pivotally connected to the first and the second slide bar respectively, the active seat is provided with a first sliding member assembled with the first guide rail and is connected to a first power source to enable the first sliding member to move along the first guide rail, the passive seat is provided with a second sliding member assembled with the second guide rail, a pivot bar is vertically provided on the passive seat, and the rotary seat is pivotally connected to at least a third sliding member; thereby, the carrier such as a camera can take pictures while moving by various arcs and angles.

11 Claims, 9 Drawing Sheets

CARRIER SLIDE-BAR DEVICE IN ARC MOTION

BACKGROUND OF THE INVENTION

1. Field of the Invention

The present invention relates to a slide-bar device enabling a carrier such as a video recorder to move by arcs.

2. Description of the Related Art

Figure 1:
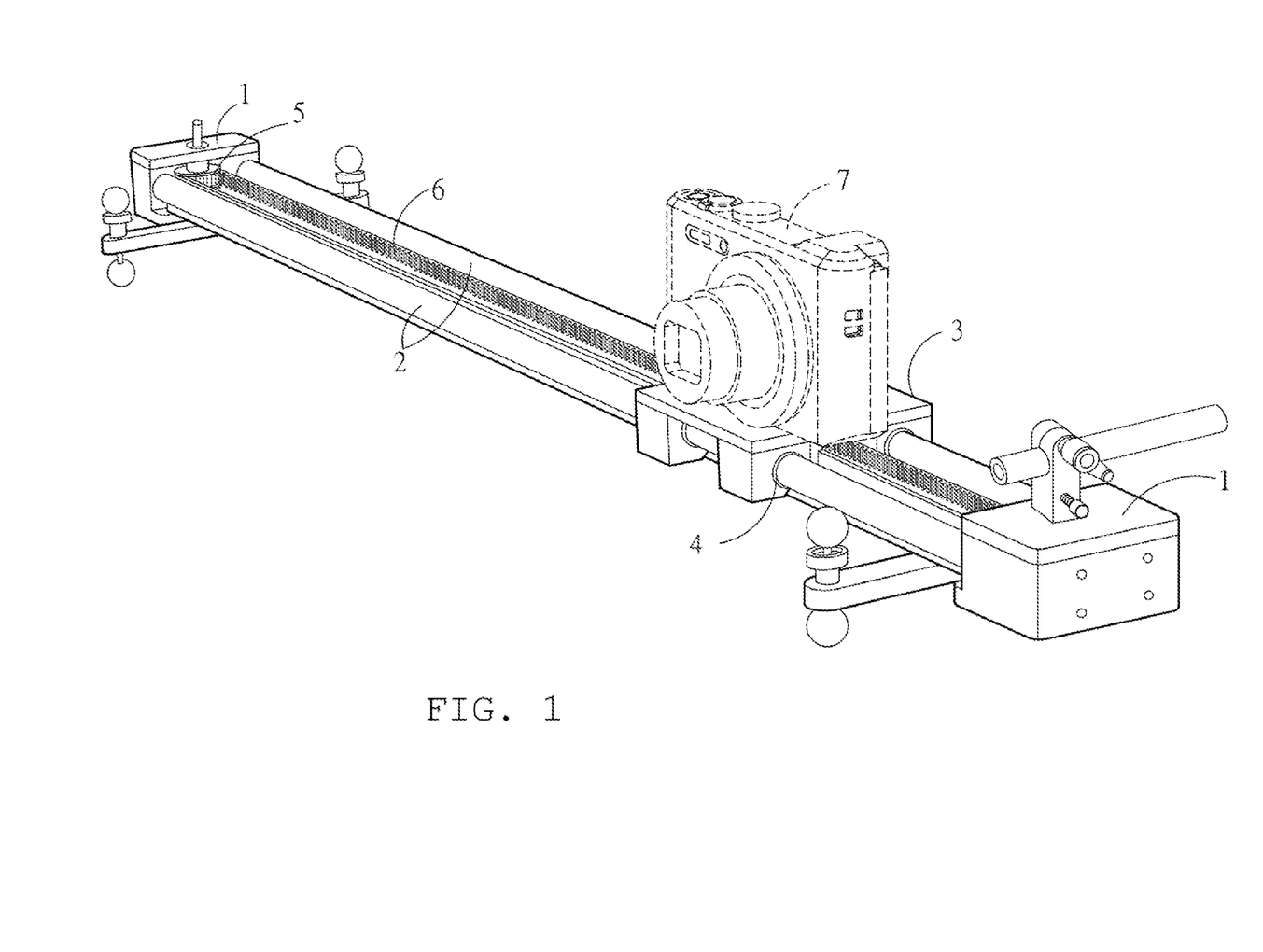
FIG. 1 is a schematic diagram of an existing track structure on which a camera is mounted.

When taking moving pictures, a camera needs to move in sync with the moving pictures. If the camera is held by hand, the problem of shaking and unsteadiness may be caused due to shake of the human body or lack of support to the hands, and thus the pictures taken are fuzzy and unclear. Therefore, a photographer may use a movable track structure as shown in FIG. 1. The track structure includes a left and a right fixed seat 1 corresponding to each other, two cylindrical slide bars 2 connected between the two fixed seats 1, and a base 3 assembled with the two slide bars 2. Two through holes 4 are provided on the bottom of the base 3, and the base 3 is assembled with the two slide bars 2 by means of the two through holes 4. The two fixed seats 1 are each pivotally connected to a sliding member 5, and a driving band 6 is wound on the two sliding members 5. The driving band 6 is connected and fixed to the base 3, and is enabled to rotate, thereby driving the base 3 to move along the two slide bars 2. A camera 7 is mounted on the base 3 and is movable with the base 3. Therefore, the problem that the pictures taken are fuzzy due to shake of the camera held by hand can be solved.

However, according to the existing track structure, the camera 7 can only move linearly, and cannot meet the requirements of the photographer. The main reason is that the pictures to be taken usually move by arcs, and the track structure only for linear displacement cannot be used for taking pictures in arc motion. Although arc-shaped tracks are available in the market, these existing arc-shaped tracks are fixed with a non-adjustable curvature, take a large space for storage, and have the disadvantage that the arc trajectory cannot be adjusted for taking changing pictures, so they still need to be improved.

SUMMARY OF THE INVENTION

Therefore, the main object of the present invention is to provide a carrier slide-bar device in arc motion, through which a carrier such as a camera mounted thereon takes an arc path as its moving trajectory.

Another object of the present invention is to provide a carrier slide-bar device in arc motion, which has a first slide bar and a second slide bar that are pivotally connected and are movably apart to form any angle or form a straight line, enabling the carrier to move by arcs or linearly; and the first slide bar and the second slide bar can be folded to a smaller size for carrying or storage when the device is not used.

To achieve the above objects, the present invention provides a carrier slide-bar device in arc motion, including: a first slide bar, a second slide bar, and a third slide bar that respectively have at least a first guide rail, a second guide rail, and a third guide rail extending along the length direction of the first, the second, and the third slide bar, where a carrier is mounted on the third slide bar, the third slide bar is provided with an active seat and a passive seat respectively connected to the first slide bar and the second slide bar, the active seat is located on the first slide bar and provided with a first sliding member assembled with the first guide rail, the passive seat is located on the second slide bar and provided with a second sliding member assembled with the second guide rail, a pivot bar is vertically provided on the passive seat, a rotary seat is located on the bottom of the third slide bar and pivotally provided on the pivot bar, the rotary seat is pivotally connected to at least a third sliding member assembled with the third guide rail, the pivot bar and the rotary seat are connected through a second bearing, two side surfaces of the first slide bar are each provided with the first guide rail, a bottom seat is provided on the bottom of the third slide bar, a cylindrical bar is vertically provided on the active seat, the bottom seat and the cylindrical bar are connected through a first bearing, and two sides of the active seat are each provided with two first sliding members matching with the first guide rail.

Two side surfaces of the second slide bar are each provided with the second guide rail, and two sides of the passive seat are each provided with two second sliding members matching with the second guide rail.

Two sides of the third slide bar are each provided with the third guide rail extending along the length direction of the third guide rail, and two sides of the rotary seat are each pivotally connected to the third sliding member assembled with the third slide bar.

The third slide bar is provided with a carrier seat on which the carrier is mounted, and two side surfaces of the carrier seat are each pivotally provided with two fourth sliding members assembled with the third guide rail.

Two ends of the first slide bar are each pivotally connected to a first driving wheel, a first driving band is wound on the two first driving wheels, the first driving band is connected to the active seat, and one of the two first driving wheels is driven by a first power source to rotate. Two ends of the second slide bar are each pivotally connected to a second driving wheel, a second driving band is wound on the two second driving wheels, the second driving band is connected to the passive seat, and one of the two second driving wheels is driven by a second power source to rotate. Two ends of the third slide bar are each pivotally connected to a third driving wheel, a third driving band is wound on the two third driving wheels, the third driving band is connected and fixed to the carrier seat, and one of the two third driving wheels is driven by a third power source to rotate. The first, the second, and the third power source are connected to a controller.

One end of the first slide bar and one end of the second slide bar are respectively provided with a first connecting lug and a second connecting lug, the first connecting lug and the second connecting lug are stacked, and a connecting element passes through the first and the second connecting lug to make the first and the second connecting lug pivotally connected to each other.

The present invention provides a carrier slide-bar device in arc motion, including a first slide bar, assembled with a first sliding member and a first driving band, two ends of the first driving band being fixedly connected to the first slide bar, the first sliding member being pivotally provided with a first driving wheel and two first idle wheels, the first driving wheel being driven by a first power source to rotate, the first driving band passing through one of the two first idle wheels and passing through the first driving wheel and then being wound on the other of the two first idle wheels, and the first sliding member being provided with a cylindrical bar; a second slide bar, assembled with a second sliding member and a second driving band, two ends of the second driving band being fixedly connected to the second slide bar, the second sliding member being pivotally provided with a second driving wheel and two second idle wheels, the second driving wheel being driven by a second power source to rotate, the second driving band passing through one of the two second idle wheels and passing through the second driving wheel and then being wound on the other of the two second idle wheels, and the second sliding member being provided with a pivot bar; a third slide bar on which a carrier is mounted, the third slide bar being assembled with a carrier seat and a third driving band, two ends of the third driving band being fixedly connected to the third slide bar, the carrier seat being pivotally provided with a third driving wheel and two third idle wheels, the third driving wheel being driven by a third power source to rotate, the third driving band passing through one of the two third idle wheels and passing through the third driving wheel and then being wound on the other of the two third idle wheels, and the cylindrical bar and the pivot bar being respectively pivotally connected to the bottom of the third slide bar.

A bottom seat and a rotary seat are provided on the bottom of the third slide bar, the bottom seat and the cylindrical bar are connected through a first bearing, and the rotary seat and the pivot bar are connected through a second bearing.

The third driving wheel and the two third idle wheels are positioned in the shape of a triangle.

The first, the second, and the third driving band are belts; and the first, the second, and the third power source are motors all connected to a controller.

A first connecting lug is provided on one end of the first slide bar, a second connecting lug is provided on one end of the second slide bar and is stacked with the first connecting lug, and a connecting element passes through the first connecting lug and the second connecting lug to make one end of the first slide bar and one end of the second slide bar pivotally connected to each other.

Therefore, the controller controls the first power source, the second power source, and the third power source to respectively start the first sliding member, the second sliding member, and the third sliding member to rotate so as to drive the first driving band, the second driving band, and the third driving band to rotate. The third driving band rotates and drives the carrier seat to move along the third slide bar. When the active seat is driven by the first driving band to move along the first slide bar, the passive seat provided on the third slide bar moves with the active seat. If the carrier such as a camera mounted on the third slide bar displaces on the third slide bar through the carrier seat, the active seat and the passive seat on the bottom of the third slide bar also respectively move along the first guide rail of the first slide bar and the second guide rail of the second slide bar, and the carrier such as a camera moves by an arc path, such that the picture taking trajectory travels along the arc path. In this way, the problems that an existing track structure for photographing can only enable a camera to move linearly, or a track structure of a fixed arc-shape cannot have its arc moving trajectory adjusted for taking changing pictures are effectively solved.

In addition, according to the present invention, because one end of the first slide bar and one end of the second slide bar are pivotally connected to each other, the first slide bar and the second slide bar are connected and are movably apart to form any angle or form a straight line, enabling a camera to move by a linear trajectory; and the present invention has the advantage that the first slide bar and the second slide bar can be folded to a smaller size for carrying or storage when the device is not used.

DETAILED DESCRIPTION OF THE PREFERRED EMBODIMENTS

The detailed content and technical description of the present invention are further illustrated by embodiments below, and it should be understood that these embodiments are merely for illustration, instead of limiting the implementation of the present invention.

Figure 2:
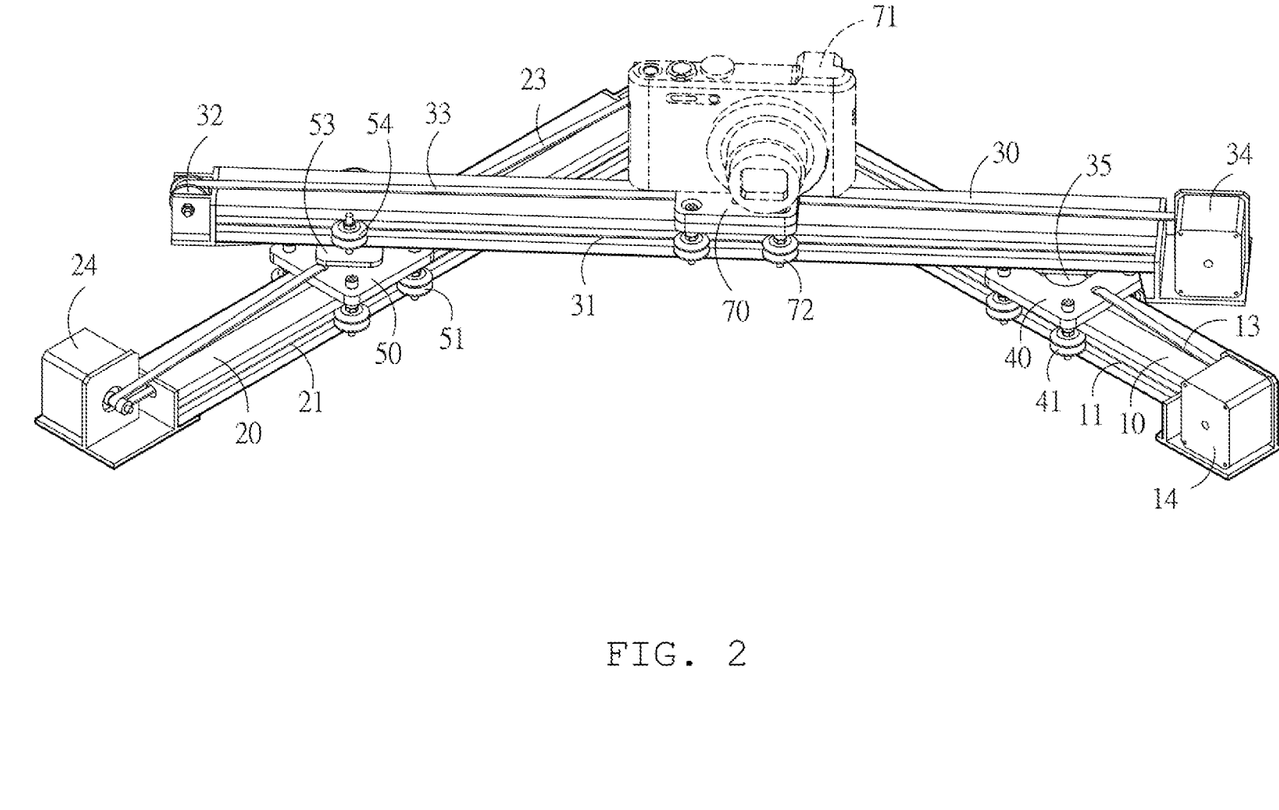
FIG. 2 is a three-dimensional combined diagram of a first embodiment of the present invention.
Figure 3:
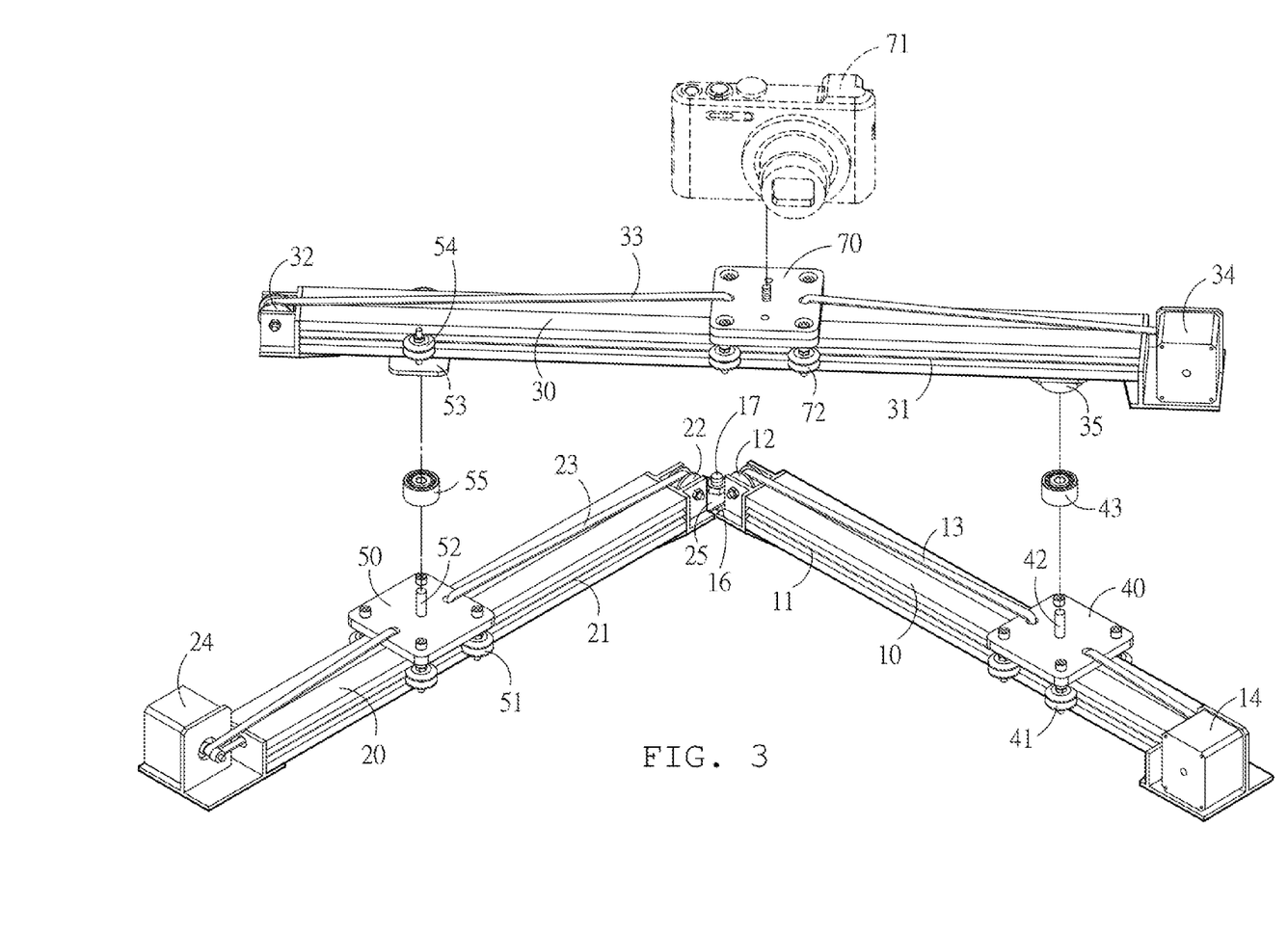
FIG. 3 is a three-dimensional exploded diagram of the first embodiment of the present invention.
Figure 4:
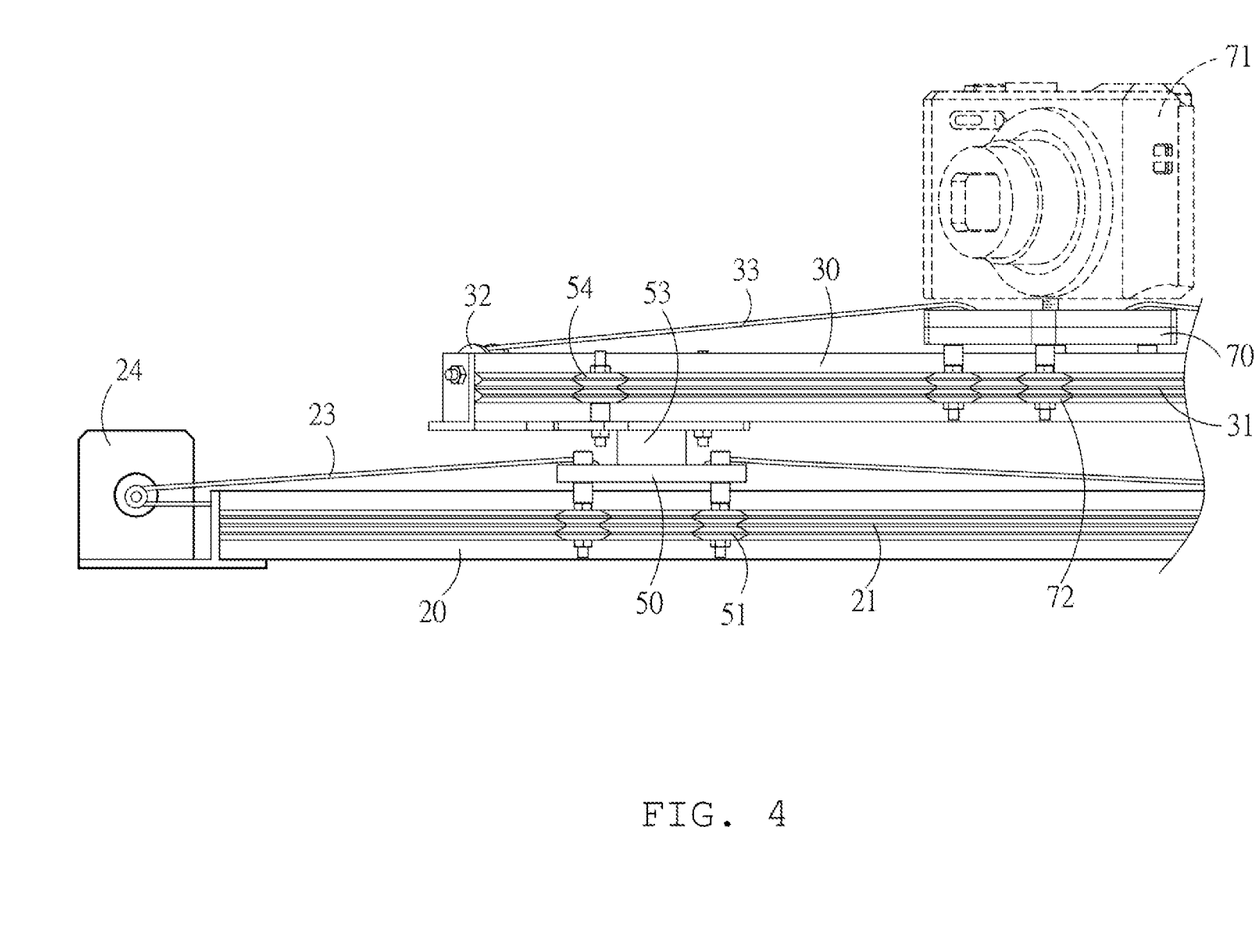
FIG. 4 is a partial plane diagram of the first embodiment of the present invention.

Referring to FIG. 2 and FIG. 4, a first embodiment of a carrier slide-bar device in arc motion of the present invention includes: a first slide bar 10a, a second slide bar 20, a third slide bar 30, and an active seat 40 and a passive seat 50 that are provided below the third slide bar 30 and are respectively connected to the third slide bar 30 and the second slide bar 20.

The first slide bar 10 has at least a first guide rail 11 extending along the length direction of the first slide bar 10. In the present embodiment, two side surfaces of the first slide bar 10 are each provided with the first guide rail 11, two sides of the active seat 40 are each provided with two first sliding members 41 matching with the first guide rail 11, the active seat 40 is a plate across the first slide bar 10, the active seat 40 is driven by a first power source 14 such as a motor, two ends of the first slide bar 10 are each pivotally connected to a first driving wheel 12 such as a timing belt pulley, a first driving band 13 such as a timing belt is wound on the two first driving wheels 12 and is connected and fixed to the active seat 40, one of the two first driving wheels 12 is driven by the first power source 14 to rotate such that the active seat 40 moves with the rotation of the first driving band 13; and a first connecting lug 16 is provided on one end of the first slide bar 10.

The second slide bar 20 has at least a second guide rail 21 extending along the length direction of the second slide bar 20. In the present embodiment, two side surfaces of the second slide bar 20 are each provided with the second guide rail 21, two sides of the passive seat 50 are each provided with two second sliding members 51 matching with the second guide rail 21, the passive seat 50 is a plate across the second slide bar 20, the passive seat 50 is driven by a second power source 24 such as a motor, a pivot bar 52 is provided on the passive seat 50, two ends of the second slide bar 20 are each pivotally connected to a second driving wheel 22 such as a timing belt pulley, a second driving band 23 such as a timing belt is wound on the two second driving wheels 22, the second driving band 23 is connected and fixed to the passive seat 50, one of the two second driving wheels 22 is driven by the second power source 24 to rotate, a second connecting lug 25 is provided on one end of the second slide bar 20 and is stacked with the first connecting lug 16, the first connecting lug 16 and the second connecting lug 25 are stacked, a connecting element 17 such as a bolt passes through the first connecting lug 16 and the second connecting lug 25 and is then locked with a nut, such that the first slide bar 10 and the second slide bar 20 are pivotally connected to each other and are movably apart to form any angle or form a straight line.

The third slide bar 30, on which a carrier 71 such as a video recorder or camera is mounted, has at least a third guide rail 31 extending along the length direction of the third slide bar 30, and the rotary seat 53 is pivotally connected to a third sliding member 54 that is assembled with the third guide rail 31 and moves along the third guide rail 31. In the present embodiment, two sides of the third slide bar 30 are each provided with the third guide rail 31, two sides of the rotary seat 53 are each pivotally connected to the third sliding member 54 assembled with the third guide rail 31, a bottom seat 35 and a rotary seat 53 are provided on the bottom of the third slide bar 30, a cylindrical bar 42 is vertically provided on the active seat 40, the bottom seat 35 and the cylindrical bar 42 are connected through a first bearing 43 such that the bottom seat 35 is enabled to rotate freely on the active seat 40, the rotary seat 53 and the pivot bar 52 on the passive seat 50 are connected through a second bearing 55 such that the rotary seat 53 is enabled to rotate freely on the passive seat 50, the third slide bar 30 is provided with a carrier seat 70 on which the carrier 71 is mounted, the carrier seat 70 is a plate and two side surfaces thereof are each pivotally connected to at least a fourth sliding member 72, the fourth sliding member 72 is assembled with the third guide rail 31 and moves along the third guide rail 31. In the present embodiment, the two side surfaces of the carrier seat 70 are each pivotally provided with two fourth sliding members 72, the carrier seat 70 is driven by a third power source 34 such as a motor, two ends of the third slide bar 30 are each pivotally connected to a third driving wheel 32 such as a timing belt pulley, a third driving band 33 such as a timing belt is wound on the two third driving wheels 32, the third driving band 33 is connected and fixed to the carrier seat 70, one of the two third driving wheels 32 is driven by the third power source 34 to rotate, and the first power source 14, the second power source 24, and the third power source 34 are all connected to a controller (not shown) which controls the start time and turn-off of the first power source 14, the second power source 24, and the third power source 34.

According to the device, further referring to FIG. 2 and FIGS. 5A to 5C, the controller may set the time and speed for controlling the first power source 14, the second power source 24, and the third power source 34 to respectively start the first driving wheel 12, the second driving wheel 22, and the third driving wheel 32 to rotate so as to drive the first driving band 13, the second driving band 23, and the third driving band 33 to rotate, thereby driving the active seat 40 and the passive seat 50 to move; as the bottom seat 35 and the rotary seat 53 on the bottom of the third slide bar are respectively pivotally connected to the cylindrical bar 42 and the pivot bar 52, the third slide bar 30 is enabled to move on the first and the second slide bar 10, 20, and as the third driving band 33 is connected and fixed to the carrier seat 70, the carrier seat 70 moves along the third guide rail 31 through the assembly of the fourth sliding member 72 and the third guide rail 31, thereby driving the carrier 71 to displace along the third guide rail 31.

Because the third slide bar 30 is pivot connected to the cylindrical bar 42 of the active seat 40 through the bottom seat 35 and the active seat 40 is fixedly connected to the first driving band 13, when the first power source 14 is started to drive the active seat 40 to move, the first sliding members 41 on the two sides of the active seat 40 move along the first guide rail 11, and one end of the third slide bar 30 changes positions along the first slide bar 10. The active seat 40 moves along the first guide rail 11 of the first slide bar 10, the passive seat 50 provided on the third slide bar 30 moves with the active seat 40, the active seat 40 drives the third slide bar 30 to displace and turn, the second driving band 23 rotates and drives the passive seat 50 to move such that the second sliding member 51 of the passive seat 50 displaces along the second guide rail 21 of the second slide bar 20, the passive seat 50 is connected and fixed to the second driving band 23, the second power source 24 drives the second driving wheel 22 to rotate and propel the second driving band 23 to rotate such that the passive seat 50 is driven to move along the second slide bar 20, the rotary seat 53 is pivotally connected to the passive seat 50 through the pivot bar 52 and is capable of rotating freely, such that the third sliding members 54 on the two sides of the rotary seat 53 move freely along the third guide rail 31 of the third slide bar 30.

Therefore, the controller may be set to control the first power source 14, the second power source 24, and the third power source 34 to be synchronously started to rotate, thereby driving the first driving wheel 12, the second driving wheel 22, and the third driving wheel 32 to rotate at the same time, and accordingly driving the first driving band 13, the second driving band 23, and the third driving band 33 to rotate synchronously. In this way, the carrier 71 such as a video recorder or camera can displace on the third guide rail 31 of the third slide bar 30 through the carrier seat 70, the bottom seat 35 and the rotary seat 53 on the bottom of the third slide bar 30 can respectively rotate on the active seat 40 and the passive seat 50 and move on the first guide rail 11 of the first slide bar 10 and the second guide rail 21 of the second slide bar 20 with the active seat 40 and the passive seat 50 respectively, and thus the position and direction of the third slide bar 30 are changed; therefore, the carrier 71 moves by an arc path, and the relative angles and positions of the first and the second slide bar 10, 20 can be adjusted to change the arc moving trajectory of the video recorder or camera according to the picture taking scene. In this way, the problems that an existing track structure for photographing can only enable a video recorder or camera to move linearly, or a track device of a fixed arc-shape cannot have its arc path adjusted at any time for taking changing pictures are effectively solved.

Figure 5A:
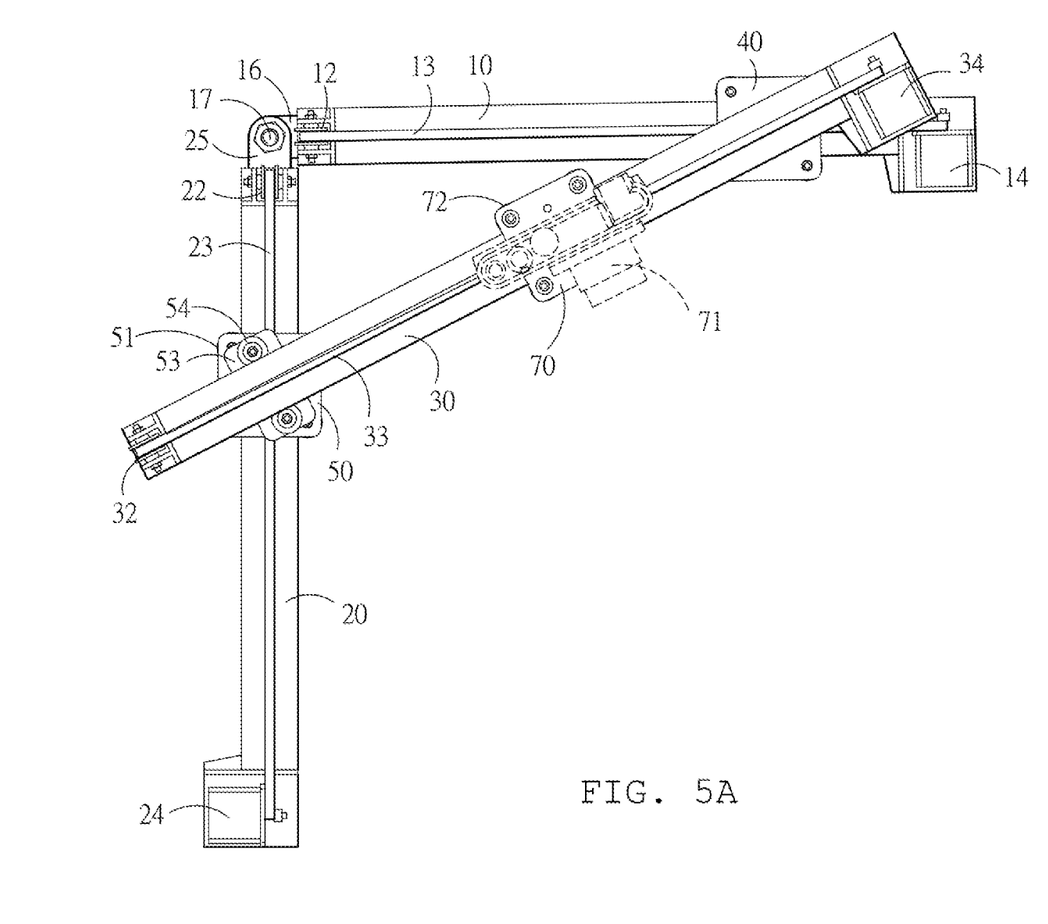
FIG. 5A is a first action diagram of the first embodiment of the present invention.
Figure 5B:
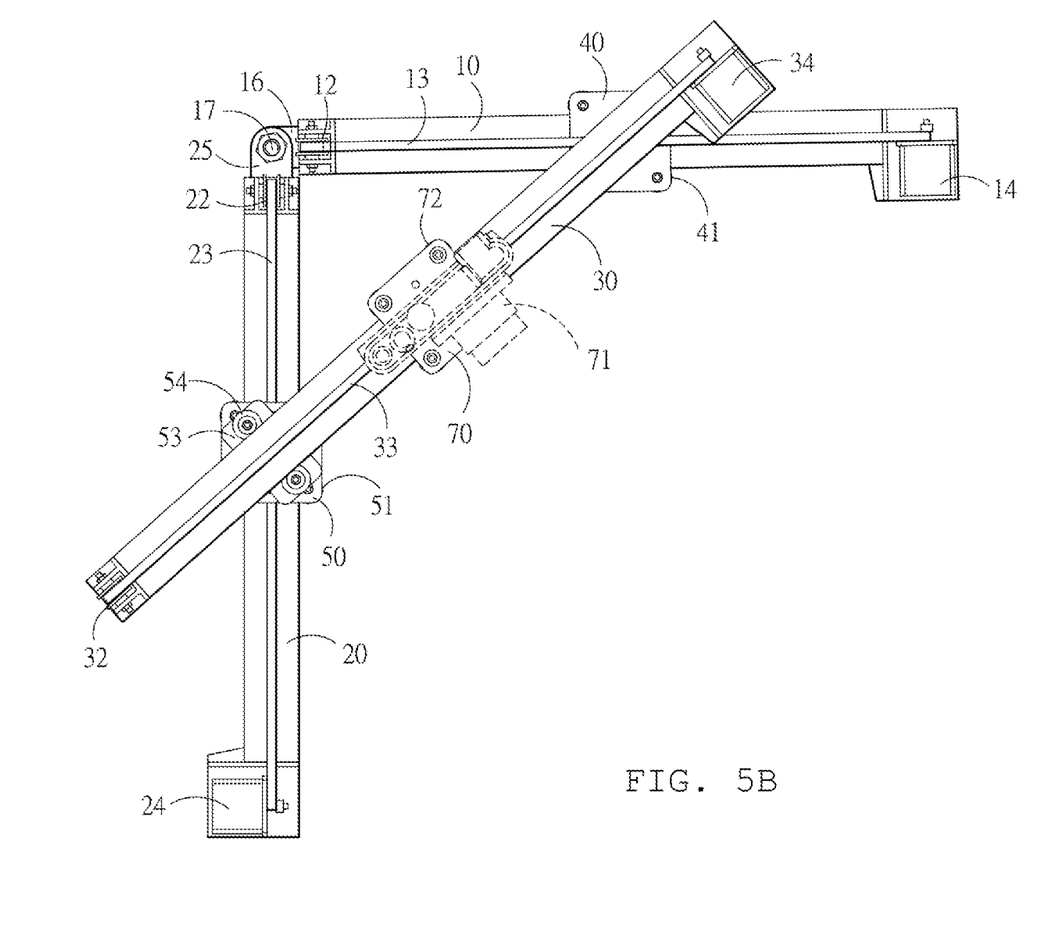
FIG. 5B is a second action diagram of the first embodiment of the present invention.
Figure 5C:
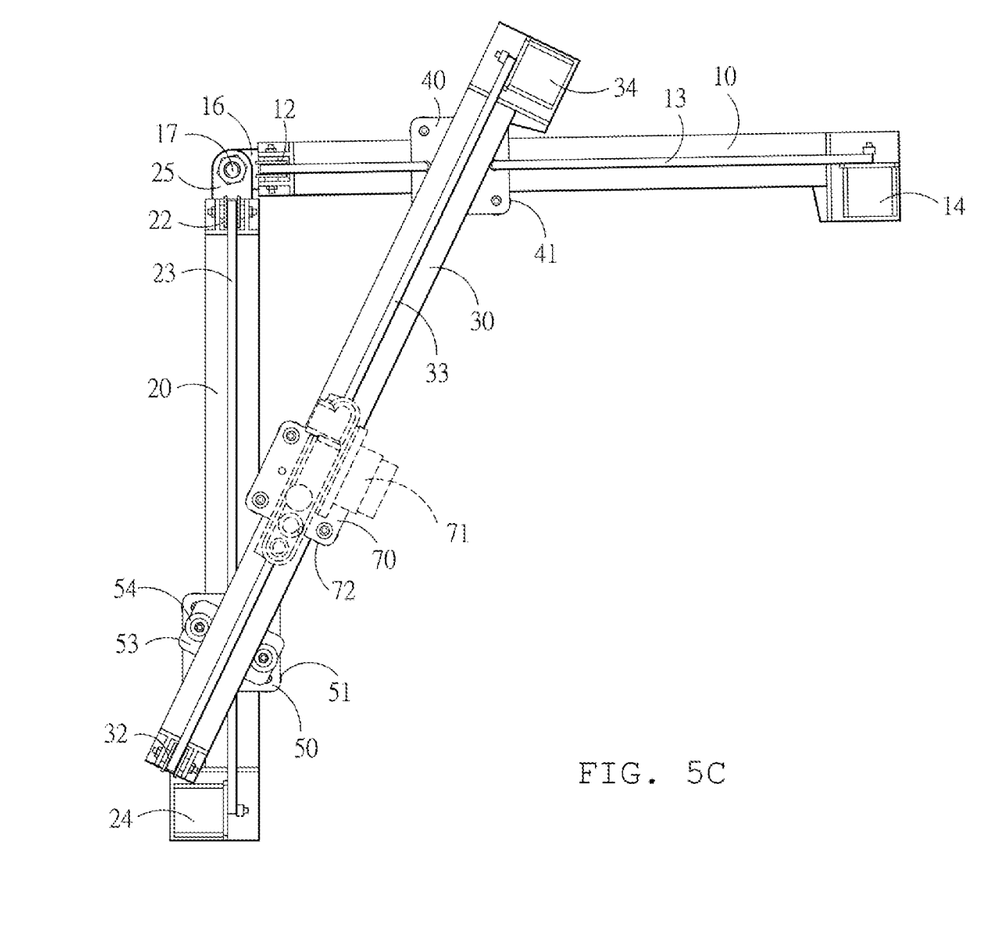
FIG. 5C is a third action diagram of the first embodiment of the present invention.
Figure 5D:
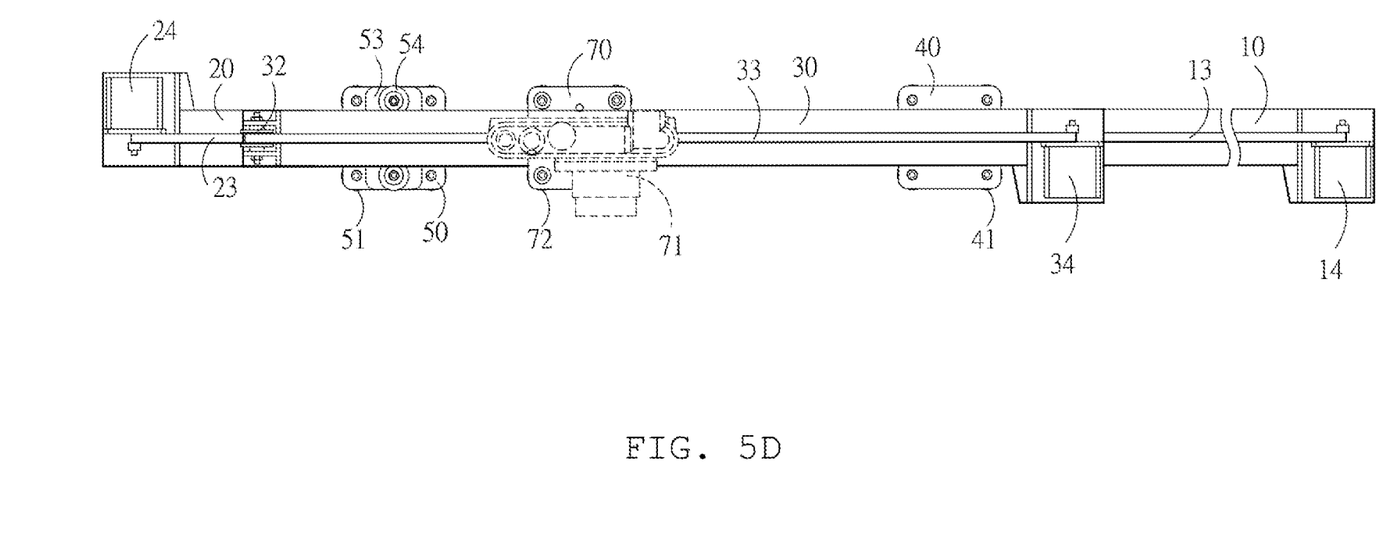
FIG. 5D is a fourth action diagram of the first embodiment of the present invention.

Further referring to FIG. 5D, when the first slide bar 10 and the second slide bar 20 forma straight line, the third slide bar 30 moves linearly on the first and the second slide bar 10, 20, the carrier 71 such as a camera mounted on the carrier seat 70 moves on the third slide bar 30, and the first slide bar 10 and the second slide bar 20 can be folded to a smaller size for carrying or storage when the device is not used.

Figure 6:
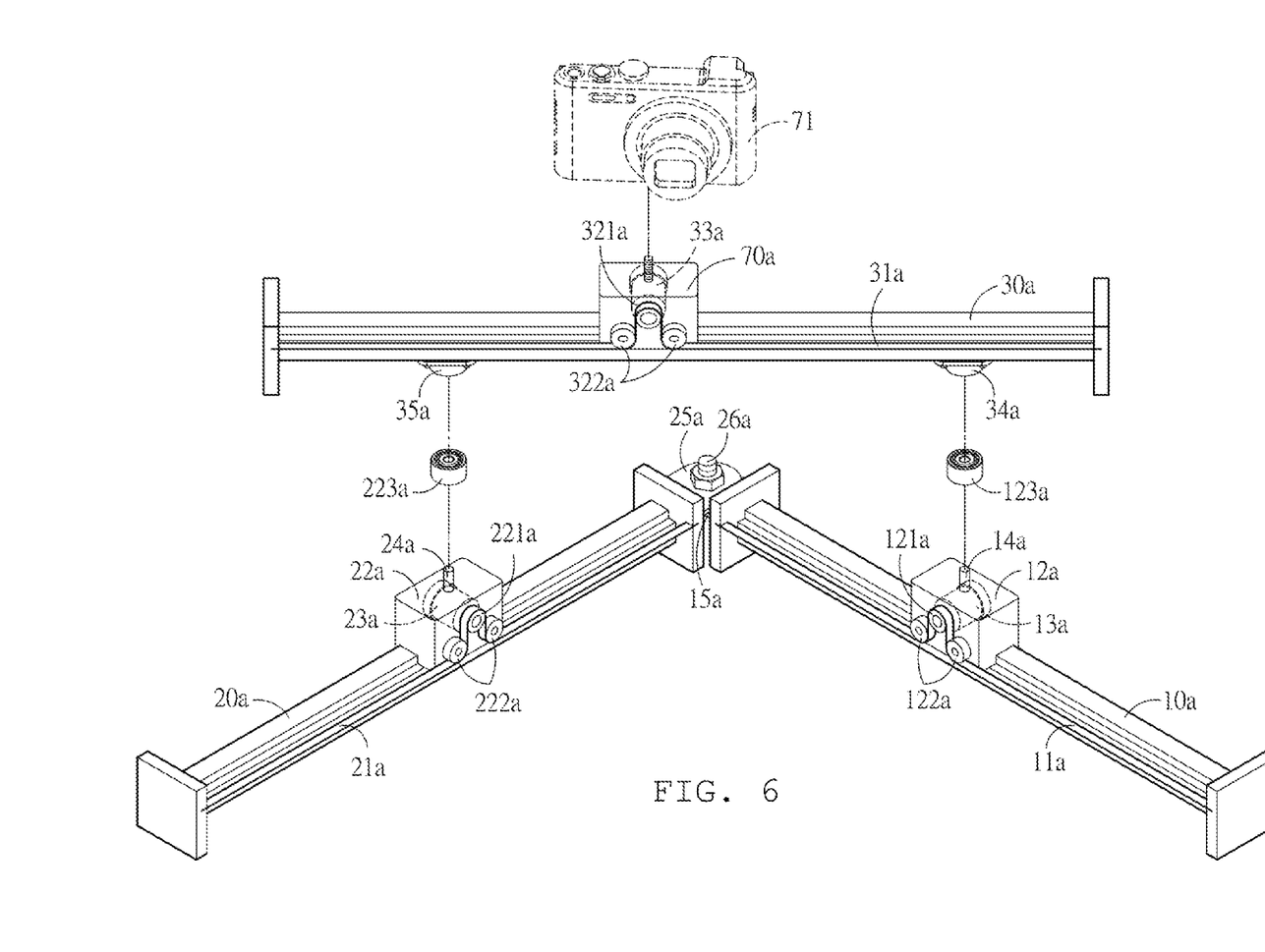
FIG. 6 is a three-dimensional exploded diagram of a second embodiment of the present invention.

Further referring to FIG. 6, a second embodiment of the carrier slide-bar device in arc motion of the present invention is provided, which includes: a first slide bar 10a, a second slide bar 20a, a third slide bar 30a, and a bottom seat 34a and a rotary seat 35a that are provided below the third slide bar 30a and are respectively connected to the third slide bar 30a and the second slide bar 20a. Two ends of the first slide bar 10a are fixedly connected to two ends of a first driving band 11a such as a belt, the first slide bar 10a is assembled with a block-shaped first sliding member 12a, the first sliding member 12a is pivotally connected to a first driving wheel 121a and two first idle wheels 122a, the first driving wheel 121a and the two first idle wheels 122a are positioned in the shape of a triangle, the first driving wheel 121a is driven by a first power source 13a such as a motor to rotate, the first power source 13a is connected to a controller (not shown) to control the on/off and the speed of the first power source 13a, the first driving band 11a passes through one of the two first idle wheels 122a and passes through the first driving wheel 121a and is then wound on the other of the two first idle wheels 122a, the first driving wheel 121a moves and rotates along the first driving band 11a, and the first sliding member 12a moves along the first slide bar 10a, the first sliding member 10a is provided with a cylindrical bar 14a, and a first connecting lug 15a is provided on one end of the first slide bar 10.

Two ends of the second slide bar 20a are fixedly connected to two ends of a second driving band 21a such as a belt, the second slide bar 20a is assembled with a block-shaped second sliding member 22a, the second sliding member 22a is pivotally connected to a second driving wheel 221a and two second idle wheels 222a, the second driving wheel 221a and the two second idle wheels 222a are positioned in the shape of a triangle, the second driving wheel 221a is driven by a second power source 23a such as a motor to rotate, the second power source 23a is connected to the controller to control the on/off and the speed of the second power source 23a, the second driving band 21a passes through one of the two second idle wheels 222a and passes through the second driving wheel 221a and is then wound on the other of the two second idle wheels 222a, the second driving wheel 221a moves and rotates along the second driving band 21a, and the second sliding member 22a moves along the second slide bar 20a, the second sliding member 20a is provided with a pivot bar 24a, a second connecting lug 25a is provided on one end of the second slide bar 20a and is stacked with the first connecting lug 15a, a connecting element 26a such as a bolt passes through the first and the second connecting lug 15a, 25a and is then locked with a nut, such that one end of the first slide bar 10a and one end of the second slide bar 20a are pivotally connected to each other, and the first slide bar 10a and the second slide bar 20a are movably apart to form any angle or form a straight line.

A carrier 71 such as a video recorder or camera is mounted on the third slide bar 30a. Two ends of the third slide bar 30a are fixedly connected to two ends of a third driving band 31a such as a belt, the third slide bar 30a is assembled with a block-shaped carrier seat 70a, the carrier seat 70a is pivotally connected to a third driving wheel 321a and two third idle wheels 322a, the third driving wheel 321a and the two third idle wheels 322a are positioned in the shape of a triangle, the third driving wheel 321a is driven by a third power source 33a such as a motor to rotate, the third power source 33a is connected to the controller to control the on/off and the speed of the third power source 33a, the third driving band 31a passes through one of the two third idle wheels 322a and passes through the third driving wheel 321a and is then wound on the other of the two third idle wheels 322a, the third driving wheel 321a moves along the third driving band 31a, and the carrier seat 70a moves and rotates along the third slide bar 30a, the bottom seat 34a and the rotary seat 35a are provided on the bottom of the third slide bar 30a, the bottom seat 34a and the cylindrical bar 14a are connected through a first bearing 123a, the rotary seat 35a and the pivot bar 24a are connected through a second bearing 223a, and the carrier 71 such as a video recorder or camera is mounted on the carrier seat 70a.

Because the bottom seat 34a on the bottom of the third slide bar 30a is pivotally connected to the cylindrical bar 14a through the first bearing 123a and is rotatable on the first sliding member 122a, and the rotary seat 35a and the pivot bar 24a are connected through the second bearing 223a and are rotatable on the second sliding member 222a, when the first power source 13a is started to drive the first driving wheel 121a to rotate, the first driving wheel 121a moves along the first driving band 11a, drives the first sliding member 12a to move along the first slide bar 10a, and propels the rotary seat 35a to drive the second sliding member 22a to displace along the second slide bar 20a. Besides, the second power source 23a is connected to the controller and is driven at the same time, such that the second sliding member 22a moves along the second slide bar 20a synchronously. Moreover, the controller starts the third power source 33a to drive the third driving wheel 321a to rotate, and the third driving wheel 321a moves along the third driving band 31a, thereby enabling the carrier seat 70a to move along the third slide bar 30a. As the carrier seat 70a on the third slide bar 30a moves synchronously, the carrier 71 mounted on the carrier seat 70a moves by an arc path.

When the first slide bar 10a and the second slide bar 20a are apart to form a straight line, the third slide bar 30a moves linearly on the first slide bar 10a and the second slide bar 20a, the carrier 71 such as a camera mounted on the carrier seat 70a moves on the third slide bar 30a, and the first slide bar 10a and the second slide bar 20a can be folded to a smaller size for carrying or storage when the device is not used.

The present invention has been disclosed above by the preferred embodiments, and persons skilled in the art should understand that these embodiments are merely used for describing the present invention, instead of limiting the scope of the present invention. It should be noted that, any equivalent changes and modifications to the embodiments shall all fall within the scope of the present invention. Thus, the protection scope of the present invention is defined by the appended claims in the following.

REFERENCE NUMERALS (The Prior Art)
1: fixed seat
2: slide bar
3: base
4: through hole
5: sliding member
6: belt
7: camera
(The First Embodiment of the Present Invention)
10: first slide bar
11: first guide rail
12: first driving wheel
13: first driving band
14: first power source
16: first connecting lug
17: connecting element
20: second slide bar
21: second guide rail
22: second driving wheel
23: second driving band
24: second power source
25: second connecting lug
30: third slide bar
31: third guide rail
32: third driving wheel 33: third driving band
34: third power source
35: bottom seat
40: active seat
41: first sliding member
42: cylindrical bar
43: first bearing
50: passive seat
51: second sliding member
52: pivot bar
53: rotary seat
54: third sliding member
55: second bearing
70: carrier seat
71: carrier
72: fourth sliding member
(The Second Embodiment of the Present Invention)
10a: first slide bar
11a: first driving band
12a: first sliding member
121a: first driving wheel
122a: first idle wheel
123a: first bearing
13a: first power source
14a: cylindrical bar
15a: first connecting lug
20a: second slide bar
21a: second driving band
22a: second sliding member
221a: second driving wheel
222a: second idle wheel
223a: second bearing
23a: second power source
221a: second driving wheel
222a: second idle wheel
223a: second bearing
24a: pivot bar
25a: second connecting lug
26a: connecting element
30a: third slide bar
31a: third driving band
321a: third driving wheel
322a: third idle wheel
33a: third power source
34a: bottom seat
35a: rotary seat
70a: carrier seat
71: carrier

What is claimed is:

1. A carrier slide-bar device in arc motion, comprising:
a first slide bar, having at least a first guide rail extending along the length direction of the first slide bar;
a second slide bar, having at least a second guide rail extending along the length direction of the second slide bar;
a third slide bar, on which a carrier is mounted, wherein the third slide bar is provided with at least a third guide rail extending along the length direction of the third slide bar and is provided with an active seat and a passive seat pivotally connected to the first slide bar and the second slide bar respectively, the active seat is located on the first slide bar and provided with a first sliding member assembled with the first guide rail, the passive seat is located on the second slide bar and provided with a second sliding member assembled with the second guide rail, a pivot bar is vertically provided on the passive seat, a rotary seat is located on the bottom of the third slide bar and pivotally provided on the pivot bar, the rotary seat is pivotally connected to a third sliding member assembled with the third guide rail, the pivot bar and the rotary seat are connected through a second bearing, two side surfaces of the first slide bar are each provided with the first guide rail, a bottom seat is provided on the bottom of the third slide bar, a cylindrical bar is vertically provided on the active seat, the bottom seat and the cylindrical bar are connected through a first bearing, and two sides of the active seat are each provided with two first sliding members matching with the first guide rail.

2. The carrier slide-bar device in arc motion according to claim 1, wherein two side surfaces of the second slide bar are each provided with the second guide rail, and two sides of the passive seat are each provided with two second sliding members matching with the second guide rail.

3. The carrier slide-bar device in arc motion according to claim 2, wherein two sides of the third slide bar are each provided with the third guide rail extending along the length direction of the third guide rail, and two sides of the rotary seat are each pivotally connected to the third sliding member assembled with the third slide bar.

4. The carrier slide-bar device in arc motion according to claim 3, wherein the third slide bar is provided with a carrier seat on which the carrier is mounted, and two side surfaces of the carrier seat are each pivotally provided with two fourth sliding members assembled with the third guide rail.

5. The carrier slide-bar device in arc motion according to claim 1, wherein the two ends of the first slide bar are each pivotally connected to a first driving wheel, a first driving band is wound on the two first driving wheels, the first driving band is connected to the active seat, and one of the two first driving wheels is driven by a first power source to rotate; the two ends of the second slide bar are each pivotally connected to a second driving wheel, a second driving band is wound on the two second driving wheels, the second driving band is connected to the passive seat, and one of the two second driving wheels is driven by a second power source to rotate; the two ends of the third slide bar are each pivotally connected to a third driving wheel, a third driving band is wound on the two third driving wheels, the third driving band is connected and fixed to the carrier seat, and one of the two third driving wheels is driven by a third power source to rotate; the first, the second, and the third power source are connected to a controller.

6. The carrier slide-bar device in arc motion according to claim 1, wherein one end of the first slide bar and one end of the second slide bar are respectively provided with a first connecting lug and a second connecting lug, the first connecting lug and the second connecting lug are stacked, and a connecting element passes through the first and the second connecting lug to make the first and the second connecting lug pivotally connected to each other.

7. A carrier slide-bar device in arc motion, comprising:
a first slide bar, assembled with a first sliding member and a first driving band, two ends of the first driving band being fixedly connected to the first slide bar, the first sliding member being pivotally provided with a first driving wheel and two first idle wheels, the first driving wheel being driven by a first power source to rotate, the first driving band passing through one of the two first idle wheels and passing through the first driving wheel and then being wound on the other of the two first idle wheels, and the first sliding member being provided with a cylindrical bar;

a second slide bar, assembled with a second sliding member and a second driving band, two ends of the second driving band being fixedly connected to the second slide bar, the second sliding member being pivotally provided with a second driving wheel and two second idle wheels, the second driving wheel being driven by a second power source to rotate, the second driving band passing through one of the two second idle wheels and passing through the second driving wheel and then being wound on the other of the two second idle wheels, and the second sliding member being provided with a pivot bar;

a third slide bar on which a carrier is mounted, the third slide bar being assembled with a carrier seat and a third driving band, two ends of the third driving band being fixedly connected to the third slide bar, the carrier seat being pivotally provided with a third driving wheel and two third idle wheels, the third driving wheel being driven by a third power source to rotate, the third driving band passing through one of the two third idle wheels and passing through the third driving wheel and then being wound on the other of the two third idle wheels, and the cylindrical bar and the pivot bar being respectively pivotally connected to the bottom of the third slide bar.

8. The carrier slide-bar device in arc motion according to claim 7, wherein a bottom seat and a rotary seat are provided on the bottom of the third slide bar, the bottom seat and the cylindrical bar are connected through a first bearing, and the rotary seat and the pivot bar are connected through a second bearing.

9. The carrier slide-bar device in arc motion according to claim 7, wherein the third driving wheel and the two third idle wheels are positioned in the shape of a triangle.

10. The carrier slide-bar device in arc motion according to claim 7, wherein the first, the second, and the third driving band are belts; and the first, the second, and the third power source are motors all connected to a controller.

11. The carrier slide-bar device in arc motion according to claim 7, wherein a first connecting lug is provided on one end of the first slide bar, a second connecting lug is provided on one end of the second slide bar and is stacked with the first connecting lug, and a connecting element passes through the first connecting lug and the second connecting lug to make one end of the first slide bar and one end of the second slide bar pivotally connected to each other.

* * * * *